US012719115B2

(12) United States Patent
Li

(10) Patent No.: US 12,719,115 B2
(45) Date of Patent: Aug. 25, 2026

(54) POWER BATTERY TOP COVER AND POWER BATTERY

(71) Applicant: EVE POWER CO., LTD., Jingmen (CN)

(72) Inventor: Xing Li, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 480 days.

(21) Appl. No.: 18/556,390

(22) PCT Filed: Jul. 28, 2022

(86) PCT No.: PCT/CN2022/108474

§ 371 (c)(1),
(2) Date: Oct. 20, 2023

(87) PCT Pub. No.: WO2023/115947

PCT Pub. Date: Jun. 29, 2023

(65) Prior Publication Data

US 2024/0194987 A1 Jun. 13, 2024

(30) Foreign Application Priority Data

Dec. 22, 2021 (CN) ........................ 202123244603.0

(51) Int. Cl.
*H01M 50/15* (2021.01)
*H01M 50/103* (2021.01)
(Continued)

(52) U.S. Cl.
CPC ......... *H01M 50/15* (2021.01); *H01M 50/103* (2021.01); *H01M 50/184* (2021.01);
(Continued)

(58) Field of Classification Search
CPC .. H01M 50/15; H01M 50/184; H01M 50/188; H01M 50/342
See application file for complete search history.

(56) References Cited

U.S. PATENT DOCUMENTS

2017/0040579 A1 2/2017 Guen et al.

FOREIGN PATENT DOCUMENTS

CN 205177898 U 4/2016
CN 208062115 U * 11/2018
(Continued)

OTHER PUBLICATIONS

European Office Action issued in corresponding European Patent Application No. 22909277.0 dated Jul. 3, 2025, pp. 1-8.
(Continued)

*Primary Examiner* — Stephan J Essex
(74) *Attorney, Agent, or Firm* — PV IP PC; Wei Te Chung; Christopher S. Ruprecht

(57) ABSTRACT

Provided in the present application are a power battery top cover and a power battery. The power battery top cover is used for being connected to a housing in which a cell is mounted. The power battery top cover mainly comprises a cover plate, upper plastic, a sealing ring and a pole. The cover plate is provided with a first through hole and a first groove, and the upper plastic is provided with a second through hole; the upper plastic is embedded in the first groove, and a lower surface thereof and the first groove form a ventilation portion; part of the sealing ring is embedded in the first through hole; and the pole passes through the first through hole and the second through hole and is in interference fit connection with the sealing ring and the upper plastic.

20 Claims, 3 Drawing Sheets

(51) Int. Cl.
*H01M 50/184* (2021.01)
*H01M 50/188* (2021.01)
*H01M 50/342* (2021.01)
*H01M 50/55* (2021.01)
*H01M 50/557* (2021.01)
*H01M 50/567* (2021.01)

(52) U.S. Cl.
CPC ....... *H01M 50/188* (2021.01); *H01M 50/342* (2021.01); *H01M 50/55* (2021.01); *H01M 50/557* (2021.01); *H01M 50/567* (2021.01)

(56) References Cited

FOREIGN PATENT DOCUMENTS

| | | | |
|---|---|---|---|
| CN | 110048037 | A | 7/2019 |
| CN | 213340531 | U | 6/2021 |
| CN | 214411343 | U | 10/2021 |
| EP | 3723153 | A1 | 10/2020 |
| EP | 3916892 | A1 | 12/2021 |

OTHER PUBLICATIONS

International Search Report in International application No. PCT/CN2022/108474,mailed on Oct. 10, 2022.

Written Opinion of the International Search Authority in International application No. PCT/CN2022/108474, mailed on Oct. 10, 2022.

* cited by examiner

POWER BATTERY TOP COVER AND POWER BATTERY

CROSS-REFERENCE TO RELATED APPLICATIONS

The present disclosure is a national stage of International Application No. PCT/CN2022/108474, filed on Jul. 28, 2022, which claims priority to Chinese Patent application Ser. No. 202123244603.0, filed with the China National Intellectual Property Administration on Dec. 22, 2021. Both of the aforementioned applications are hereby incorporated by reference in their entireties.

TECHNICAL FIELD

The present disclosure relates to the field of power battery technologies, for example, relates to a power battery top cover and a power battery.

BACKGROUND

A power battery is used as a core energy storage component of an electric vehicle, and sealing performance of the power battery directly affects a safety factor of the electric vehicle. Sealing performance of a power battery top cover of the power battery is a key to determine the sealing performance of the power battery. In a case that the power battery top cover is failed, it leads to a leakage in a core pack in the power battery, decreased energy storage performance, or even lead to danger such as short circuit, fire, and explosion of the core pack. The sealing performance of the power battery top cover in related technologies mainly relies on a compression by a pole post or a pole plate on a sealing ring. These structures are substantially formed by riveting or integrated injection molding, and the contact between an upper plastic part and an aluminum plate is tight. As a result, in a case that the sealing ring is failed, the sealing performance of the power battery top cover cannot be detected effectively and quickly, thereby affecting safety performance of the core pack.

SUMMARY

The present disclosure provides a power battery top cover, which has a simple structure and is easy to produce. In a case that a sealing ring is failed, an external detection tool can be used to detect the failed sealing ring in time, thereby improving safety performance of the power battery top cover and increasing a product yield.

The present disclosure provides a power battery top cover, including:

- a cover plate provided with a first through-hole and a first groove;

an upper plastic part provided with a second through-hole, wherein the upper plastic part is embedded in the first groove, and a vent portion is defined between a lower surface of the upper plastic part and the first groove;

- a sealing ring partially embedded in the first through-hole; and
- a pole post partially extended through the first through-hole and the second through-hole, wherein the pole post is in an interference fit with the sealing ring and the upper plastic part.

The present disclosure further provides a power battery, which has strong safety performance and can improve work efficiency. Therefore, a risk of leakage from the core pack or even explosion of the power battery can be avoided.

The present disclosure provides a power battery, including:

- a casing provided with an opening;
- a core pack mounted in the casing; and
- the power battery top cover as mentioned above, wherein the power battery top cover covers the opening.

LIST OF REFERENCE NUMERALS

100. Power battery top cover;

1. Cover plate; 11. First through-hole; 12. First groove;

2. Upper plastic part; 21. Vent portion; 22. Protrusion; 23. Second through-hole; 211. Upper plastic part vent hole; 212. Cover plate vent hole;

3. Sealing ring; 31. First boss; 4. Pole post; 41. Second boss;

5. Pole plate; 51. Second groove; 6. Explosion-proof valve; 7. Liquid injection hole;

200. Casing; 300. Core pack.

DETAILED DESCRIPTION OF THE EMBODIMENTS

The technical solution of the present disclosure is explained below with reference to the accompanying drawings and embodiments.

In the description of the present disclosure, terms “linked”, “connected”, and “fixed” should be understood in a broad sense. For example, the connection may be a fixed connection, a detachable connection, or an integral connection; or the connection may be a mechanical connection or an electrical connection; or the connection may be a direct connection, an indirect connection through an intermediate, or internal communication between two elements or an interaction relationship between two elements. A person of ordinary skill in the art may understand the meanings of the foregoing terms in the present disclosure according to an actual situation.

In the present disclosure, a first feature is “on” or “below” a second feature may indicate that the first feature and the second feature are in direct contact, or the first feature and the second feature are in contact through additional features between them rather than in direct contact. In addition, that the first feature is “above”, “over”, or “on” the second feature may indicate that the first feature is directly above and obliquely above the second feature, or may merely indicate that the horizontal position of the first feature is higher than that of the second feature. That the first feature is “below”, “under”, or “beneath” the second may indicate that the first feature is directly below and obliquely below the second feature, or may merely indicate that the horizontal height of the first feature is lower than that of the second feature.

In the description of the present embodiment, orientation or position relationships indicated by terms such as "upper", "lower", "left", and "right" are based on orientation or position relationships shown in the accompanying drawings, and are used only for ease of description and simplifying operations, rather than indicating or implying that the mentioned apparatus or element has a particular orientation or is constructed and operated in a particular orientation. In addition, the terms "first" and "second" are only used to distinguish from descriptions and have no specific meaning.

Embodiment 1

Figure 1:
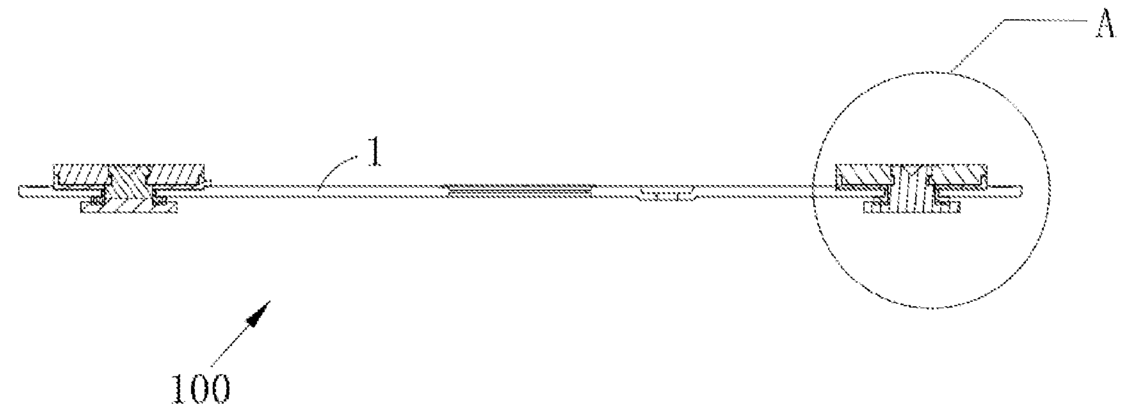
FIG. 1 is a cross-sectional view of a power battery top cover according to some embodiments of the present disclosure.
Figure 2:
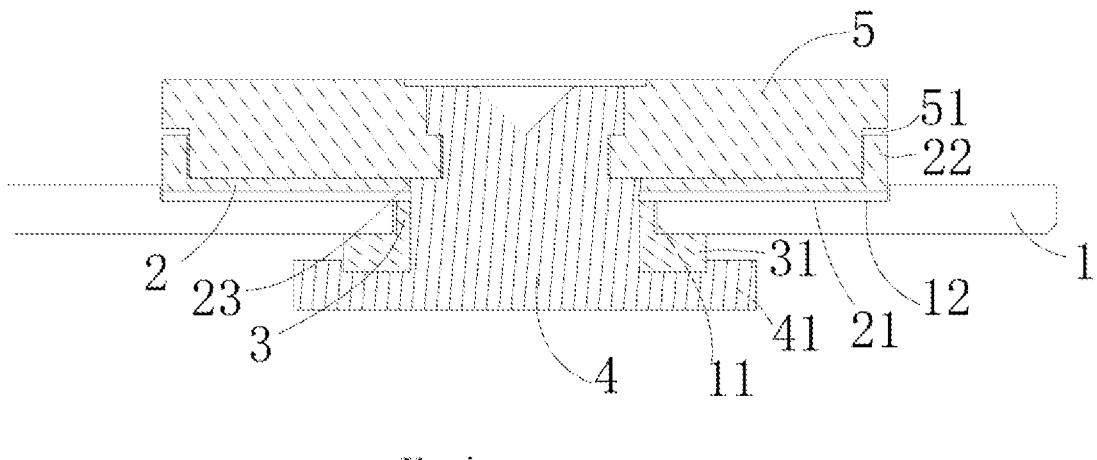
FIG. 2 is a partial enlarged view of A in FIG. 1.

As shown in FIGS. 1 and 2, the present embodiment provides a power battery top cover 100. The power battery top cover 100 is configured to be connected to a casing in which a core pack is mounted. The power battery top cover 100 mainly includes a cover plate 1, an upper plastic part 2, a sealing ring 3, and a pole post 4. The cover plate 1 is provided with a first through-hole 11 and a first groove 12. The upper plastic part 2 is provided with a second through-hole 23. The upper plastic part 2 is embedded in the first groove 12, and a vent portion 21 is defined between a lower surface of the upper plastic part 2 and the first groove 12. The sealing ring 3 is partially embedded in the first through-hole 11. The pole post 4 partially extends through the first through-hole 11 and the second through-hole 23, and is in an interference fit with the sealing ring 3 and the upper plastic part 2.

Based on the above structures, during actual manufacturing of the power battery top cover 100, in a case that the sealing ring 3 is failed, gas in a lower surface area of the cover plate 1 can pass through the failed sealing ring 3 and flow through the vent portion 21. Then, an operator can use an external detection tool or equipment to detect an airflow in time, and can determine that the power battery top cover 100 is unqualified. In this way, the power battery top cover 100 with poor sealing performance is prevented from going to subsequent manufacturing processes, thereby increasing a product yield of the power battery top cover 100 and improving the reliability and safety of the power battery top cover 100. Therefore, production efficiency is improved. The cover plate 1 may be made of lightweight aluminum metal material. Two pole posts 4 may be provided, one is a positive pole post and the other is a negative pole post, to facilitate charging and discharging a power battery. In addition, the pole post 4 may alternatively be made of aluminum metal material or copper metal material, and details are not described herein again.

Compared with related technologies, the power battery top cover 100 in the present embodiment has a simple structure and is easy to produce. By defining the vent portion 21 between the upper plastic part 2 and the cover plate 1, the airflow can pass through the vent portion 21 from one side of the cover plate 1 and then flow to the other side of the cover plate 1. In this way, the external detection tool can detect a failed sealing ring 3 in time, thereby increasing the product yield of the power battery top cover 100 and improving the reliability and safety of the power battery top cover 100.

Figure 3:
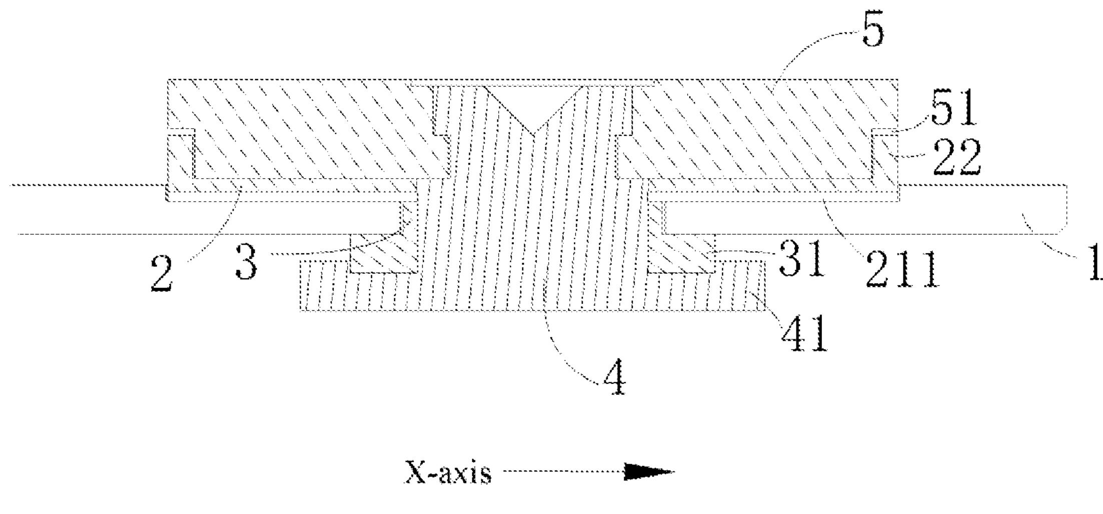
FIG. 3 is a partial enlarged view of A in FIG. 1.

As shown in FIG. 3, for example, an upper plastic part vent hole 211 may be integrally injected and molded on the upper plastic part 2 by the operator. The upper plastic part vent hole 211 is the vent portion 21. Therefore, in a case that the sealing ring 3 is failed, the gas in the lower surface area of the cover plate 1 can pass through the failed sealing ring 3 and flow through the upper plastic part vent hole 211, and then flow to an upper surface area of the cover plate 1. The operator can use the external detection tool to detect unqualification of the sealing ring 3 of the power battery top cover 100, to rework the unqualified sealing ring in time. In this way, the power battery top cover 100 with poor sealing performance is prevented from going to subsequent manufacturing processes and affecting the reliability and safety of the power battery top cover 100. Therefore, production efficiency and the safety performance of the power battery top cover 100 are improved.

In the present embodiment, the vent portion 21 is provided around an axis of the upper plastic part 2. In this way, the stability of the upper plastic part 2 during mounting can be improved and the upper plastic part 2 is more evenly stressed. In a case that the sealing ring 3 is failed, the gas in the lower surface area of the cover plate 1 can flow out of the vent portion 21 in time, thereby improving work efficiency of the operator in detecting the unqualification of the sealing ring 3. In another embodiment of the present disclosure, the operator may alternatively provide the vent portion 21 at another position on the upper plastic part 2 according to an actual situation, as long as it can be ensured that when the sealing ring 3 is failed, the gas in the lower surface area of the cover plate 1 can flow out of the vent portion 21 in time.

As shown in FIGS. 1 and 2, in the present embodiment, the sealing ring 3 includes a first boss 31. The first boss 31 is arranged between the lower surface of the cover plate 1 and the pole post 4. A length of the first boss 31 is greater than a length of the first through-hole 11 in a radial direction (an X-axis direction) of the first through-hole. In this way, the reliability and stability of a connection between the sealing ring 3 and the cover plate 1 can be enhanced. The sealing ring 3 can be prevented from slipping out of the first through-hole 11 when the pole post 4 is riveted to the cover plate 1. In addition, an end of the pole post 4 close to the first boss 31 is provided with a second boss 41. A length of the second boss 41 is greater than the length of the first boss 31 in the X-axis direction. In this way, as the pole post 4 is riveted to the cover plate 1, the second boss 41 can compress the first boss 31, thereby enabling the first boss 31 to be embedded between the cover plate 1 and the second boss 41. Therefore, the sealing performance of the sealing ring 3 on the cover plate 1 and the pole post 4 is improved.

In another embodiment of the present disclosure, the first boss 31, the second boss 41, and the first through-hole 11 may have a circular shape, which facilitates improving the stability and reliability of the power battery top cover 100. The operator may alternatively set the first boss 31, the second boss 41, and the first through-hole 11 to another shape according to an actual situation, as long as the sealing performance on the power battery top cover 100 can be ensured.

As shown in FIGS. 1 and 2, in the present embodiment, the power battery top cover 100 further includes a pole plate 5 riveted to the pole post 4. On one hand, the pole plate 5 is arranged to protect the upper plastic part 2. On the other hand, the pole plate 5 is riveted to the pole post 4 to improve the strength and stability of the pole post 4. Optionally, in the present embodiment, the pole plate 5 is provided with a second groove 51, the upper plastic part 2 is provided with a protrusion 22, and the protrusion 22 is in an interference fit with the second groove 51. In this way, as the protrusion 22 is in an interference fit with the second groove 51, the stability and reliability of a connection between the upper plastic part 2 and the pole plate 5 can be improved. Therefore, a risk of displacement or detachment of the pole plate 5 from the upper plastic part 2 during a normal operation of the power battery cover plate 1 can be avoided.

Figure 5:
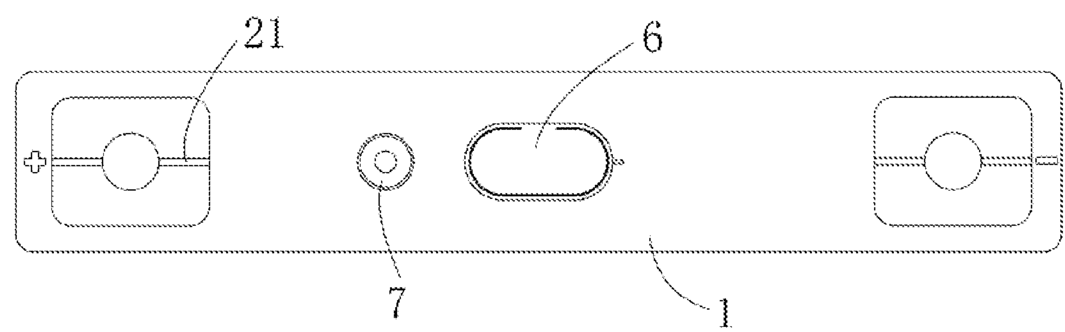
FIG. 5 is a top view of a power battery top cover according to some embodiments of the present disclosure.

As shown in FIG. 5, in the present embodiment, the cover plate 1 may be further provided with an explosion-proof valve 6 and a liquid injection hole 7. The explosion-proof valve 6 is embedded in the cover plate 1. In a case that the heat from thermal runaway is concentrated in the power battery, or the air pressure is increased in the power battery, the explosion-proof valve 6 can burst open to release the pressure in the power battery. In this way, the power battery top cover 100 is protected, and the power battery is prevented from exploding due to the excessively large pressure inside. The liquid injection hole 7 is configured for injection of electrolytic solution into the power battery.

Figure 6:
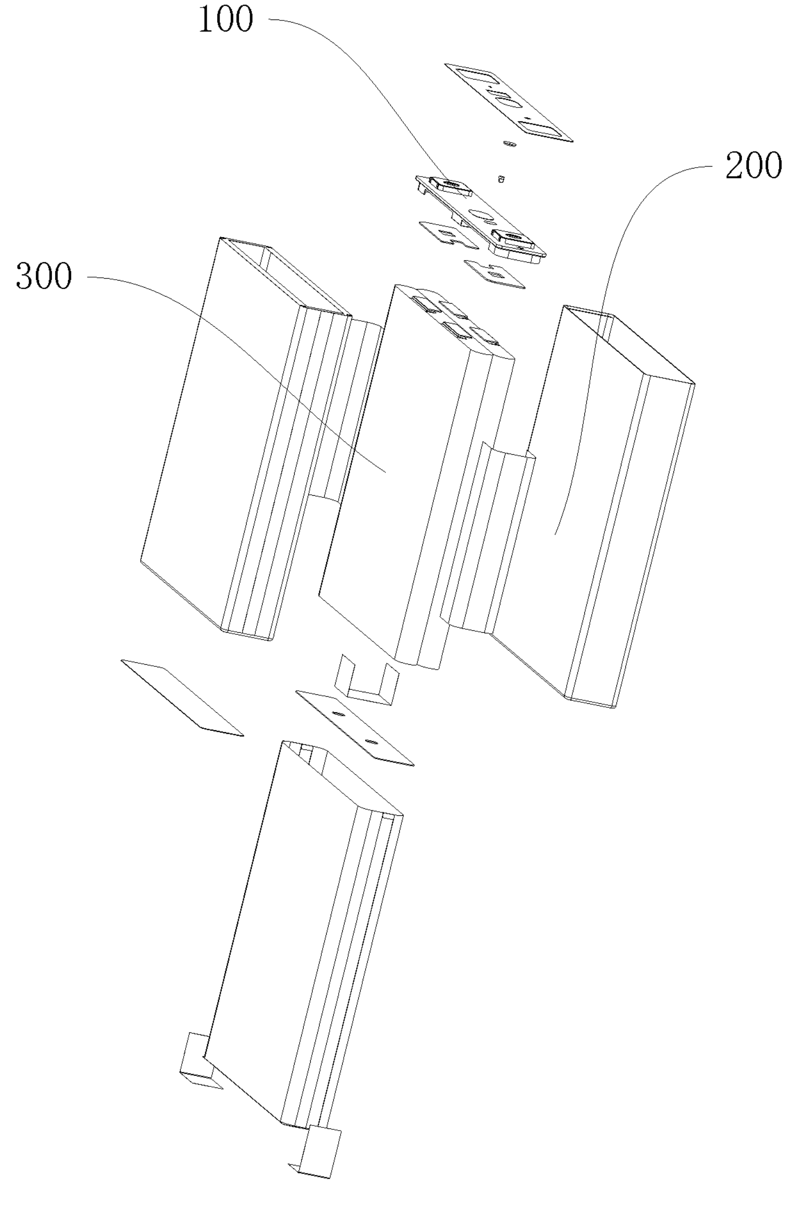
FIG. 6 is an exploded view of a power battery according to some embodiments of the present disclosure.

As shown in FIG. 6, a power battery is provided in the present embodiment. The power battery includes a casing 200, a core pack 300, and the power battery top cover 100. The casing 200 is provided with an opening, the core pack 300 is mounted inside the casing 200, and the power battery top cover 100 covers the opening. A size and shape of the power battery top cover 100 fits a size and shape of the opening on the casing 200. Therefore, the stability and reliability of a connection between the power battery top cover 100 and the casing 200 can be ensured. In a case that the sealing ring 3 on the power battery top cover 100 is failed, gas generated by the core pack 300 can pass through the failed sealing ring 3 and flow to the upper plastic part vent hole 211, and then flow out of the cover plate 1. The operator can use an external detection tool or equipment to detect the power battery with the failed sealing ring 3 in time, and then maintain the power battery or replace the power battery with a new power battery in time. In this way, work efficiency and the safety performance of the power battery can be improved.

The power battery provided in the present disclosure has high safety performance. In a case that the sealing ring is failed, the operator can detect the power battery with the failed sealing ring in time, and then maintain the power battery or replace the power battery with a new power battery in time. In this way, work efficiency and the safety performance of the power battery can be improved, thereby avoiding the risk of core pack leakage or even explosion of the power battery.

Embodiment 2

Figure 4:
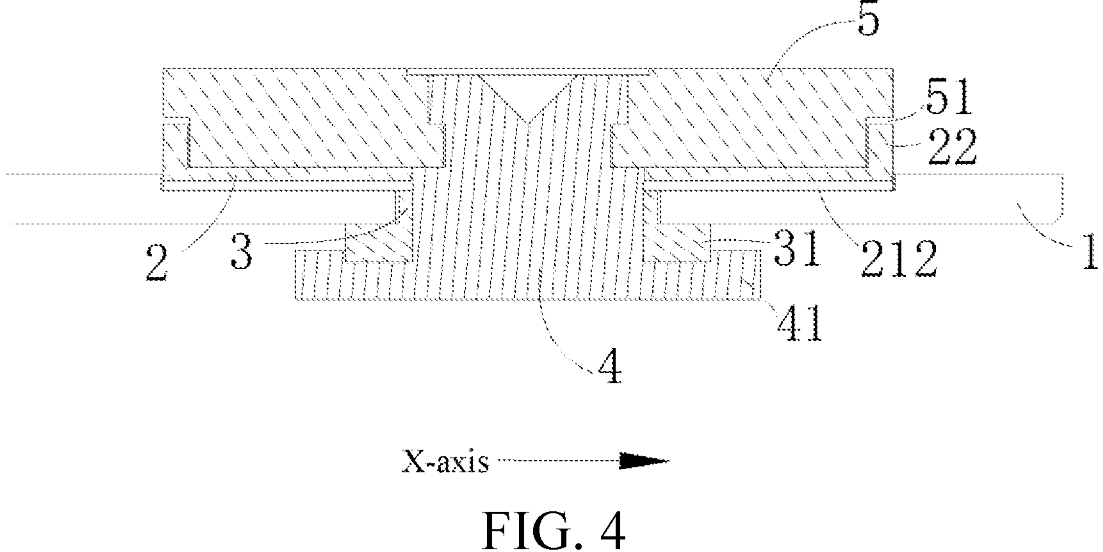
FIG. 4 is a partial enlarged view of A in FIG. 1.

The present embodiment provides a power battery top cover 100. As shown in FIG. 4, the power battery top cover 100 in the present embodiment is provided with a plurality of cover plate vent holes 212. Each of the cover plate vent holes 212 is formed by punching. The cover plate vent hole 212 is the vent portion 21 of Embodiment 1. Therefore, in a case that the sealing ring 3 is failed, the gas in the lower surface area of the cover plate 1 can pass through the failed sealing ring 3 and flow through the cover plate vent hole 212, and then flow to the upper surface area of the cover plate 1. The operator can use the external detection tool to detect the unqualification of the sealing ring 3 of the power battery top cover 100 and rework the unqualified sealing ring in time. In this way, the power battery top cover 100 with poor sealing performance is prevented from going to subsequent manufacturing processes and affecting the reliability and safety of the power battery top cover 100. Therefore, production efficiency and the safety performance of the power battery top cover 100 are improved.

In the present embodiment, the vent portion 21 is provided around an axis of the cover plate 1 along the X-axis. In this way, the stability of the cover plate 1 during mounting can be improved and the cover plate 1 is more evenly stressed. In a case that the sealing ring 3 is failed, the gas in the lower surface area of the cover plate 1 can flow out of the vent portion 21 in time, thereby improving work efficiency of the operator in detecting the unqualification of the sealing ring 3. In another embodiment of the present disclosure, the operator may alternatively provide the vent portion 21 at another position on the cover plate 1 according to an actual situation, as long as it can be ensured that when the sealing ring 3 is failed, the gas in the lower surface area of the cover plate 1 can flow out of the vent portion 21 in time.

In addition to punching, the operator may use methods such as cutting and drilling to form the cover plate vent hole 212. The remaining structures of the present embodiment are the same as those of Embodiment 1, and details are not described herein again.

The present embodiment provides a power battery. As shown in FIG. 6, the power battery includes a casing 200, a core pack 300, and the power battery top cover 100. The casing 200 is provided with an opening, the core pack 300 is mounted inside the casing 200, and the power battery top cover 100 covers the opening. A size and shape of the power battery top cover 100 fits a size and shape of the opening on the casing 200. Therefore, the stability and reliability of a connection between the power battery top cover 100 and the casing 200 can be ensured. In a case that the sealing ring 3 on the power battery top cover 100 is failed, gas generated by the core pack 300 can pass through the failed sealing ring 3 and flow through the cover plate vent hole 212, and then flow out of the cover plate 1. The operator can use an external detection tool or equipment to detect the power battery with the failed sealing ring 3 in time, and then maintain the power battery or replace the power battery with a new power battery in time. In this way, work efficiency and the safety performance of the power battery can be improved, thereby avoiding the risk of core pack 300 leakage or even explosion of the power battery.

What is claimed is:

1. A power battery top cover, comprising:

a cover plate provided with a first through-hole and a first groove;

an upper plastic part provided with a second through-hole, wherein the upper plastic part is embedded in the first groove, and a vent portion is defined between a lower surface of the upper plastic part and the first groove;

a sealing ring partially embedded in the first through-hole; and a pole post partially extended through the first through-hole and the second through-hole, wherein the pole post is in an interference fit with the sealing ring and the upper plastic part.

2. The power battery top cover of claim 1, wherein the upper plastic part is provided with a plurality of upper plastic part vent holes, and the plurality of upper plastic part vent holes define the vent portion.

3. The power battery top cover of claim 2, wherein the upper plastic part vent holes are integrally formed through injection molding.

4. The power battery top cover of claim 1, wherein the cover plate is provided with a plurality of cover plate vent holes, and the plurality of cover plate vent holes define the vent portion.

5. The power battery top cover of claim 4, wherein the cover plate vent holes are formed by punching.

6. The power battery top cover of claim 1, wherein the sealing ring comprises a first boss arranged between a lower surface of the cover plate and the pole post, and a length of the first boss is greater than a length of the first through-hole in a radial direction of the first through-hole.

7. The power battery top cover of claim 6, wherein an end of the pole post close to the first boss is provided with a second boss, and a length of the second boss is greater than the length of the first boss in an X-axis direction.

8. The power battery top cover of claim 1, wherein the power battery top cover further comprises a pole plate riveted to the pole post.

9. The power battery top cover of claim 8, wherein the pole plate is provided with a second groove, the upper plastic part is provided with a protrusion, and the protrusion is in an interference fit with the second groove.

10. A power battery, comprising:

a casing provided with an opening;

a battery cell mounted in the casing; and a power battery top cover of, wherein the power battery top cover covers the opening; and the power battery top cover comprises:

a cover plate provided with a first through-hole and a first groove;

an upper plastic part provided with a second through-hole, wherein the upper plastic part is embedded in the first groove, and a vent portion is defined between a lower surface of the upper plastic part and the first groove;

a sealing ring partially embedded in the first through-hole; and a pole post partially extended through the first through-hole and the second through-hole, wherein the pole post is in an interference fit with the sealing ring and the upper plastic part.

11. The power battery top cover of claim 2, wherein the sealing ring comprises a first boss arranged between a lower surface of the cover plate and the pole post, and a length of the first boss is greater than a length of the first through-hole in a radial direction of the first through-hole.

12. The power battery top cover of claim 4, wherein the sealing ring comprises a first boss arranged between a lower surface of the cover plate and the pole post, and a length of the first boss is greater than a length of the first through-hole in a radial direction of the first through-hole.

13. The power battery top cover of claim 2, wherein the power battery top cover further comprises a pole plate riveted to the pole post.

14. The power battery top cover of claim 13, wherein the pole plate is provided with a second groove, the upper plastic part is provided with a protrusion, and the protrusion is in an interference fit with the second groove.

15. The power battery of claim 10, wherein the upper plastic part is provided with a plurality of upper plastic part vent holes, and the plurality of upper plastic part vent holes define the vent portion.

16. The power battery of claim 10, wherein the cover plate is provided with a plurality of cover plate vent holes, and the plurality of cover plate vent holes define the vent portion.

17. The power battery of claim 10, wherein the sealing ring comprises a first boss arranged between a lower surface of the cover plate and the pole post, and a length of the first boss is greater than a length of the first through-hole in a radial direction of the first through-hole.

18. The power battery of claim 11, an end of the pole post close to the first boss is provided with a second boss, and a length of the second boss is greater than the length of the first boss in an X-axis direction.

19. The power battery of claim 10, wherein the power battery top cover further comprises a pole plate riveted to the pole post.

20. The power battery of claim 19, wherein the pole plate is provided with a second groove, the upper plastic part is provided with a protrusion, and the protrusion is in an interference fit with the second groove.

* * * * *